United States Patent Office 3,321,425
Patented May 23, 1967

3,321,425
VINYL CHLORIDE POLYMERS CONTAINING FATTY ACID AND FATTY ACID SALTS
Karl-Ludwig Blau, Ettlingen, and Alfons Herr, Karlsruhe, Germany, Josef Lintner, La Garenne-Colombes, France, and Otto Wilhelm, Karlsruhe, Germany, assignors to Vinypal S.A., Luxembourg, Luxembourg, a corporation of Luxembourg
No Drawing. Filed July 21, 1965, Ser. No. 473,859
Claims priority, application Germany, May 23, 1959, B 53,340
12 Claims. (Cl. 260—23)

This application is a continuation-in-part application of Ser. No. 30,419, filed May 20, 1960.

The present invention relates to the preparation of dry, finely granulated synthetic resin compositions which are readily dispersible in water to form stable aqueous dispersions. The invention relates in particular to such compositions which are suitable for addition to aqueous wood pulp or aqueous cellulose fiber pulp dispersions in the manufacture of reinforced pulp.

It has been proposed to add finely subdivided thermoplastic synthetic resins to aqueous pulps of wood and cellulose fibers and to disperse the resin uniformly in pulp. The resin is then filtered off with the fibrous matter to produce reinforced paper and/or cartons. Such processes are technically difficult to execute, particularly when strongly hydrophobic synthetic resins such as vinyl chloride homopolymers and copolymers are used. It has been proven difficult to uniformly disperse small proportions of such resins in water using mechanical means. The use of wetting or emulsifying agents to facilitate the dispersion of resins has not been successful. The use of such agents tends to decrease the impermeability of the finished product to water. They also result in a loss of synthetic resin during the filtering of the fibrous pulp in amounts that are economically important. Often the concentration of solid material in the pulp is in the order of 0.3% or less. Filtering may result in significant losses. When wetting agents are used, it is hard to keep the loss of synthetic resin within feasible limits. It has also been found that it is difficult to stabilize the vinyl chloride homopolymers or copolymers in the product fiberpolymer mixture. Consequently, the formation of reinforced fibrous mats containing synthetic resins prepared by depositing the resin on the fiber in aqueous solution has rarely been used.

It is an object of the present invention to provide a thermoplastic resin in dry, granular form, comprising individual granules which are readily dispersible by simple mechanical means.

It is another object of this invention to provide such granules which can be precipitated from the aqueous dispersion on the fibrous material in the dispersion.

The invention also provides an improved process for manufacturing thermally stable resin impregnated paper and cardboard. Other objects and advantages of this invention are in part obvious and will in part become apparent from the specification.

The dry, granular resin particles of this invention comprises readily dispersed granules having a grain size of less than about 50 microns. The individual granules are each composed of small particles of the resin admixed with an alkali metal salt of an organic acid having from 12 to 20 carbon atoms in the molecule, and an additional amount of a carboxylic acid. Preferably, the ratio of said salt to said acid is between 1:9 and 1:1. The dry composite granules are made up of individual particles of the resin polymer which are generally of a size less than 1 micron, and usually of the size between 0.2 and 0.5 micron. The granules preferably also contain a heavy metal salt to provide thermal stability to the impregnated product prepared from these granules.

The resins utilized are vinyl chloride homopolymers and copolymers formed by conventional emulsion polymerization processes. They include polyvinylchloride and copolymers of vinyl chloride with an ethlenically unsaturated comonomer. Preferred copolymers are those of vinyl chloride with vinylidene chloride and/or vinyl acetate. The combination of the carboxylic acid and the salt of a carboxylic acid function to form the granules which are readily dispersable in water. The carboxylic acids utilized have between 12 and 20 carbon atoms in the chain. They may have a molecular weight of about 200, although this will vary dependent upon the metal and the acid utilized. The acid utilized should also be one which will form a water-insoluble and hydrophobic metal salt with aluminum. The preferred acids are lauric acid, palmitic acid, stearic acid, and acids such as naphthenic acid and rosin acids having a melting point below about 100° C., or mixtures of these acids. The water-soluble salts utilized are preferably the sodium, the potassium, or the ammonium salts. The granules preferably contain a stabilizer to prevent thermal degradation of the product impregnated paper or fiberboard. The stabilizers are those that are water-insoluble and which are available as particles less than 20 microns in size. These include the heavy-metal salts of carboxylic acids, and particularly the calcium, barium, strontium, cadmium, lead and tin salts.

The vinyl chloride homopolymers and copolymers are prepared by conventional emulsion polymerization techniques. The granules preferably also are produced from an emulsion whereby small particles of the resin in the order of one micron or less are mixed with the thermal stabilizer, e.g., a lead or cadmium stearate or a mixture of these which may be added dry, or preferably is added as an aqueous paste. The stabilizer is used in an amount between 1 and 5% by weight of the polymer. Preferably, the same proportion of the organic acid is suspended or emulsified in the mixture. The temperature of the mixture should be sufficiently high for the organic acid to be liquid. To facilitate the emulsion, an alkali material such as sodium carbonate is added to the latex. This also serves the function of producing the desired salt of the organic acid, e.g., a small portion of the organic acid is transformed into its sodium salt. The latex is then dried, preferably by spray drying, while the drying temperature is maintained above the melting point of the organic acid. The granule size of the product may be determined by microscopic analysis and can be controlled, for example, by control of the spray drying, or by grinding the granules after drying. By this method, a finely granulated, stabilized, synthetic resin composition is formed composed of individual small particles of (i) the resin, (ii) the thermal stabilizer, and (iii) the salt of the organic acid, all bound together by the free organic acid, to form larger granules of a size less than about 50 microns and preferably less than about 30 microns.

These granules are readily worked into water. They are quickly and readily dispersed at a pH value greater than 8 with simple mechanical means, for example with a propeller. The aqueous liquids in which the resin granules are dissolved contain a suspension of fibrous material, e.g., asbestos, glass, wood, cellulose, paper, or leather. When these granules are added to water, as aforesaid, particularly when the pH value is greater than 8 or the water is "soft," the alkali metal or ammonium salt of the organic acid in the granule is ionized and the composition becomes negatively charged and appreciably ionic. This electrically charged composition provides a stable aqueous dispersion. The impregnated paperboard is formed by precipitating the resin on the fibrous material, filtering, and pressing (with heat) the resin impregnated fibers. The resin is precipitated by neutralizing the electrically charged composition, for example by adding an acid-reacting salt of a polyvalent metal such as aluminum sulfate or alum solution at a pH less than 6. The composition flocculates as a result of the formation of an insoluble and hence a non-ionizable salt of the organic acid. The negative electric charge is neutralized by the positive electric charge of the polyvalent metal ions and the dispersion is brought down to a pH of 6 or less. The resin particles are then unstable in the liquid and precipitate on the fibrous material which is dispersed therein.

The following examples are now given in connection with the present invention in which parts are specified by weight.

*Example I*

Monomeric vinyl chloride is polymerized in conventional manner to form polyvinyl chloride in an emulsion polymerization system. 100 parts of this polyvinyl chloride and 0.20 part of sodium carbonate as a concentrated aqueous solution, and 2.5 parts of lauric acid are added to obtain an artificial resin latex at about 50° C. with intensive stirring. Then 2.6 parts of lead stearate, preferably still in filter wet condition, is dispersed in the latex. Then homogenization takes place for about 5 to 10 minutes. It is then cooled with simultaneous stirring to a temperature below 35° C. to 40° C. In this condition the latex can be stored.

The latex is transformed into a polymer chloride powder capable of being freely dispersed by drying in an atomizing drier to a loose powder which should still contain a moisture content of 1 to 5%.

*Example II*

The procedure of Example I was followed, using the ingredients listed below in the quantities specified.

100 parts of polyvinyl chloride
0.25 part of sodium carbonate
2.60 parts of stearic acid
1.30 parts of lead stearate
1.30 parts of cadmium stearate
0.10 part of aluminum oxide are treated in the manner specified in Example I.

The dispersion temperature is about 75° C.

*Example III*

The procedure of Example I was followed, using the ingredients listed below in the quantities specified.

100 parts of the emulsion polymerization copolymer of vinyl chloride (20%) and vinylidene chloride (80%)
0.25 part of sodium carbonate
2.60 parts of stearic acid
3.00 parts of tin stearate and
0.10 part of carboxymethyl cellulose.

The dispersion temperature is about 75° C.

*Example IV*

100 parts of a copolymer of vinyl chloride (80%) and vinylidene chloride (20%) prepared by an emulsion polymerization process is obtained in the form of an aqueous latex at a temperature of between about 70° C. and 80° C. A mixture prepared by boiling two parts of abietic acid with 0.2 part of caustic soda in ten parts of water is added to the latex, followed by the addition of 1.3 parts of barium stearate, 1.3 parts of cadmium stearate, and 0.10 part of colloidal soluble silicious acid. These ingredients were then homogenized by intensive stirring for 10 to 15 minutes, and then cooled while stirring, or spray dried, to form the dry readily dispersible granules of a size less than 50 microns.

*Example V*

100 parts of a fibrous (wood) material (calculated on a dry basis), 85 parts of polyvinyl chloride in the form of granules prepared as disclosed in Examples I and II, 15 parts of dioctyl phthalate, and 0.5 part of an emulsifying agent were mixed as follows: The dioctyl phthalate is emulsified by means of the emulsifying agent in about 50 parts by weight of water and this emulsion is added to the fibrous material in water. The material concentration is adjusted to 1 to 4% depending upon the stirring apparatus available, so that a good distribution of the dioctyl phthalate on the fibers is obtained. Simultaneously, the pH of the fiber pulp is adjusted to about 8.0–8.5 by the addition of caustic soda or a sodium carbonate solution.

Then the polyvinyl chloride is added in form of a latex produced in the manner stated in Example I or II, and the mixture is homogenized for about 10 to 15 minutes and finally an aluminum sulfate solution is added, until the fiber pulp reaches a pH of about 5.0. The quantity of aluminum sulfate depends upon the concentration of organic acids in the fibrous material and is regulated exclusively by the pH control.

A "damping plate" is now produced from the fiber pulp in conventional manner on long-sieve-machines having a thickness of about 6 to 15 mm. Upon pressing said dumping plate, a plate which is similar to an artificial material and formable in one dimension in its warm state can be obtained at a temperature of about 160° C.–165° C. and a pressure of about 80 kg./cm.$^2$.

In the place of pure polyvinyl chloride mixtures, copolymers with vinylidene chloride may be used (Example III or IV), which may be more easily pressed than pure polyvinyl chloride. The same also applies for mixtures of copolymers with vinyl acetate. The pressed bodies obtained thereby have, however, higher capacity of absorbing water.

*Example VI*

80 parts by weight (referring to the weight of granules) of artificial resin latex produced from the granule products of Example II or III, 20 parts by weight of dioctyl phthalate, 0.6 part by weight of an emulsifying agent and 70 parts by weight of bleached paper fibers of a grinding grade of 35°–40° were mixed as follows: the dioctyl phthalate is emulsified with an emulsifying agent in 50 parts by weight of water and this emulsion is slowly stirred into the artificial resin latex prepared in accordance with the Example II or III. Then the mixture of artificial resin and the plasticizer is added to the fiber pulp obtained in water by mudding the paper fibers. The pH of the fiber pulp is adjusted to 8.0–8.5 by the addition of caustic soda or sodium carbonate solution and the solid material concentration is adjusted depending upon the mixing device used to about 1–4% (between 3–4% when using a "Hollander" mixer and between 1–2% when using a stirring device). After thorough homogenization during a period of 15 to 20 minutes, the pH of the fiber pulp is adjusted to about 5.0–5.5 and the fiber pulp is thinned to about 0.3% of solid material content.

Then a paper is obtained in conventional manner from the fiber pulp on the paper machine, for instance with a weight of 200–300 grams/m.$^2$. This paper is hardly distinguished from a conventional paper which is free of artificial material.

If this paper is pressed at about 160° C. with a pressure of about 60 to 80 kg./cm.$^2$ or if it is fed over hot calenders, a transparent foil or artificial material is produced from the paper, which is distinguished from a conventional polyvinyl chloride foil by the fact that it cannot be deformed due to the incorporation of fibers.

It is also possible to impregnate woven material (textiles) with such artificial resin-plasticizer dispersions. The impregnated woven material is then squeezed between rollers and dried on a stretching frame. Then the dry woven material is fed over hot rollers at a temperature of about 150° C. to 160° C., or through a condensation apparatus (as is usually used for condensation of urea-melamine resins and the like). The temperature used in this procedure is about 150° C. and the duration is about 5 minutes. A woven material is obtained thereby which has the character of artificial material, the surface of which has been subjected to impregnation. The woven material does not take up any water, if a sufficient content of artificial material is contained therein and may be used as artificial leather, as furniture coverings and the like.

The granules of this invention have an average core size of less than 50 microns, and preferably between 5 and 30 microns.

The greater the content of the plasticizer in the artificial resin plasticized dispersion, the less stable becomes the dispersion. Its stability and storing ability can be improved by an increase of the portion of the thickening agent (for instance bentonite or carboxymethyl cellulose).

While we have disclosed several embodiments of the present invention, it is to be understood that these embodiments are given by example only and not in a limiting sense, the scope of the present invention being determined by the objects and the claims.

We claim:
1. Granules of synthetic resin which are readily dispersed in water comprising particles of a vinyl chloride polymer selected from the group consisting of polyvinyl chloride and copolymers of at least 80% vinyl chloride with a monoethylenically unsaturated comonomer less than 1 micron in size admixed with between 1 and 5% by weight of said polymer of a free monocarboxylic acid having 12 to 20 carbon atoms in the chain, and an alkali metal salt of a monocarboxylic acid having 12 to 20 carbon atoms in the chain, the ratio of said salt to said acid being between 1:9 and 1:1, said free acid bonding the mixture together in the form of granules which are readily dispersed in water.

2. The granules of claim 1, which also contain a water insoluble heavy metal carboxylic acid salt as a polyvinyl chloride stabilizer, in an amount between 1 and 5% by weight of said polymer.

3. The granules of claim 2, wherein said salt is a salt of said free monocarboxylic acid.

4. The granules of claim 3, wherein said vinyl chloride polymer is selected from the group consisting of polyvinyl chloride and copolymers of vinyl chloride with vinylidene chloride or vinyl acetate.

5. The granules of claim 4, wherein said acid is selected from the group consisting of stearic acid, palmitic acid, lauric acid, naphthenic acid and rosin acid.

6. The granules of claim 5, having an average size of between about 5 and 30 microns and having a moisture content of between 1% and 5%.

7. Granules which are readily dispersible in water having an average size of between 5 and 30 microns, comprising
(i) particles having a size of less than 1 micron and composed of a polymer selected from the group consisting of polyvinyl chloride, copolymers of at least 80% of vinyl chloride with vinylidene chloride, and copolymers of at least 80% of vinyl chloride with vinyl acetate,
(ii) between 1 and 5% by weight of said polymer of a polyvinyl chloride stabilizer having a particle size of less than 20 microns and being a heavy metal salt of an organic acid,
(iii) between 1 and 5% by weight of said polymer of a free monocarboxylic acid having from 12 to 20 carbon atoms in the chain,
(iv) an alkali metal salt of said free monocarboxylic acid, the ratio of said salt to said acid being between 1:9 and 1:1, and
(v) between 1 and 5% of water,
whereby said free polymer particles are coated and bonded by the mixture of the said polyvinyl chloride stabilizer, said water, said salt of said free monocarboxylic acid, and said free monocarboxylic acid.

8. The granules of claim 7, wherein said stabilizer is a salt of a metal selected from the group consisting of calcium, barium, strontium, cadmium, lead and tin.

9. The granules of claim 7, wherein said free monocarboxylic acid is selected from the group consisting of lauric acid, palmitic acid, stearic acid, naphthenic acid and rosin acid.

10. The granules of claim 9, wherein said stabilizer is lead stearate.

11. A process for preparing granules of vinyl chloride polymer of a size between 5 and 50 microns, which are readily dispersible in water, comprising
(i) preparing an aqueous emulsion of vinyl chloride polymer selected from the group consisting of polyvinyl chloride and copolymers of at least 80% of vinyl chloride with a monoethylenically unsaturated comonomer resin particles of a size less than 1 micron at a temperature of between 50 and 80° C.,
(ii) adding between 1 and 5% by weight of said polymer of a polyvinyl chloride stabilizer selected from the carboxylic acid salts of calcium, barium, strontium, cadmium, lead and tin,
(iii) adding between 1 and 5% by weight of said polymer of a free monocarboxylic acid having between 12 and 20 carbon atoms in the chain and being liquid at the temperature of said emulsion,
(iv) adding an alkali metal carbonate, to said emulsion, in an amount so that when the alkali metal ion used is calculated as the salt of said free monocarboxylic acid, the ratio of said salt to the remainder of said monocarboxylic acid is between 1:9 and 1:1, and agitating said emulsion until a homogeneous emulsion is formed, and then drying said emulsion, to remove between 95 and 99% of the water, at a temperature above the melting point of said free monocarboxylic acid, whereby dry granules of a size between 5 and 50 microns and which are readily dispersible in water, are formed.

12. The process of claim 11, wherein said emulsion is maintained at a temperature between 70 and 80° C.

References Cited by the Examiner

UNITED STATES PATENTS

| | | | |
|---|---|---|---|
| 2,948,638 | 8/1960 | Baird et al. | 260—45.75 |
| 2,957,858 | 10/1960 | O'Donnell | 260—23 |
| 2,981,722 | 4/1961 | Enk et al. | 260—92.8 |
| 3,068,184 | 12/1962 | Noorduyn et al. | 260—23 |
| 3,184,373 | 5/1965 | Arledter | 162—168 |
| 3,203,851 | 8/1965 | Blau et al. | 162—168 |
| 3,255,132 | 6/1966 | Reinecke | 260—23 |

LEON J. BERCOVITZ, *Primary Examiner.*

GEORGE F. LESMES, R. A. WHITE,
*Assistant Examiners.*